(12) United States Patent
Stewart

(10) Patent No.: US 6,942,719 B2
(45) Date of Patent: Sep. 13, 2005

(54) METHODS AND SYSTEMS FOR PRESSURE SWING REGENERATION FOR HYDROGEN GENERATION

(75) Inventor: Albert E. Stewart, Sylmar, CA (US)

(73) Assignee: The Boeing Company, Chicago, IL (US)

( * ) Notice: Subject to any disclaimer, the term of this patent is extended or adjusted under 35 U.S.C. 154(b) by 34 days.

(21) Appl. No.: 10/609,940

(22) Filed: Jun. 30, 2003

(65) Prior Publication Data

US 2004/0261617 A1 Dec. 30, 2004

(51) Int. Cl.[7] .............................................. B01D 53/047
(52) U.S. Cl. ............................ 95/106; 95/107; 95/115; 95/139; 423/230; 502/53; 502/56
(58) Field of Search .......................... 95/96, 106, 107, 95/114, 115, 139; 423/220, 230; 502/20, 53, 56

(56) References Cited

U.S. PATENT DOCUMENTS

| | | | | |
|---|---|---|---|---|
| 4,025,321 A | * | 5/1977 | Anderson et al. | 95/123 |
| 4,871,521 A | * | 10/1989 | Pendergraft | 423/230 |
| 4,908,199 A | * | 3/1990 | Sauvion et al. | 423/437.2 |
| 4,999,174 A | * | 3/1991 | Wilson et al. | 423/241 |
| 5,427,751 A | * | 6/1995 | Nalette et al. | 423/230 |
| 5,587,003 A | * | 12/1996 | Bulow et al. | 95/123 |
| 5,840,099 A | * | 11/1998 | Kratz et al. | 95/101 |
| 5,938,819 A | * | 8/1999 | Seery | 95/104 |
| 6,024,774 A | * | 2/2000 | Nakagawa et al. | 48/198.3 |
| 6,280,503 B1 | * | 8/2001 | Mayorga et al. | 95/96 |
| 6,322,611 B1 | * | 11/2001 | Engler | 95/55 |
| 6,500,236 B2 | * | 12/2002 | Suzuki et al. | 95/113 |
| 2003/0037672 A1 | * | 2/2003 | Sircar | 95/96 |
| 2004/0068932 A1 | * | 4/2004 | Stewart | 48/127.9 |

FOREIGN PATENT DOCUMENTS

| | | |
|---|---|---|
| EP | 1018485 | 7/2000 |
| JP | 2000143204 | 5/2000 |
| WO | WO 01/23302 | 4/2001 |
| WO | WO 02/085783 | 10/2002 |

OTHER PUBLICATIONS

Balasubramanian, et al., "Hydrogen From Methane in a Single-Step Process", Chemical Engineering Science, vol. 54, pp. 3543–3552, 1999.

Kurdyumov, et al., "Steam Conversion of Methane in the Presence of a Carbon Dioxide Acceptor", Neftehimia, Moscow, RU, vol. 36, No. 2, pp. 139–143, 1996.

Brun–Tsekhovoi, et al., "Thermodynamics of Methane Conversion in Presence of Carbon Dioxide Absorbent", Chemisty and Technology of Fuels and Oils, NY, vol. 12, No. 1/2, pp. 97–101, Feb. 1976.

* cited by examiner

*Primary Examiner*—Robert H. Spitzer
(74) *Attorney, Agent, or Firm*—Black Lowe & Graham, P.L.L.C.

(57) ABSTRACT

Methods and systems for pressure swing absorption for hydrogen generation are presented. In one embodiment, a method includes absorbing at least one oxide of carbon with a pressure swing absorber from a steam reformation of methane. The steam reformation may occur at an ambient pressure in excess of 300 psia and at an ambient temperature in excess of 600° centigrade. The steam reformation of methane produces a stream of product gas. The steam reformation of methane is interrupted allowing the regenerating of the pressure swing absorber at an ambient pressure of less than 10 psia and at an ambient temperature sufficient to calcine the pressure swing absorber to exude carbon dioxide.

28 Claims, 2 Drawing Sheets

METHODS AND SYSTEMS FOR PRESSURE SWING REGENERATION FOR HYDROGEN GENERATION

RELATED APPLICATIONS

This application incorporates by this reference a abandoned, commonly-owned application by the same inventor entitled "Hydrogen Generation Apparatus and Method" filed on Oct. 15, 2002 with Ser. No. 10/271,406.

FIELD OF THE INVENTION

This invention relates generally to production of hydrogen molecules and, more specifically, to use of $CO_2$ adsorbents.

BACKGROUND OF THE INVENTION

Hydrogen is a very common atom occurring in many fuels, often in the presence of carbon in organic compounds. Generally, hydrogen may be used for upgrading petroleum feed stock to more useful products. In addition, hydrogen is used in many chemical reactions, such as reducing or synthesizing compounds. Particularly, hydrogen is used as a primary chemical reactant in the production of useful commercial products, such as cyclohexane, ammonia, and methanol.

Hydrogen itself is quickly becoming a fuel of choice because it reduces green house emissions. Particularly, hydrogen can drive a fuel cell to produce electricity or can be used to produce a substantially clean source of electricity for powering industrial machines, automobiles, and other internal combustion-driven devices.

Hydrogen production systems include the recovery of bi-products from various industrial processes and the electrical decomposition of water. Presently the most economical means, however, is to remove the hydrogen from an existing organic compound. Several methods are known to remove or generate hydrogen from carbonaceous or hydrocarbon materials. Although many hydrocarbon molecules can be reformed to liberate hydrogen atoms, methane or natural gas is most commonly used.

Use of hydrocarbons as source materials has many inherent advantages. Hydrocarbon fuels are common enough to make production economical. Safe handling methods are well-developed to allow safe and expeditious transport of the hydrocarbons for use in the different reforming and generation techniques.

The main part of today's hydrogen production uses methane as a feedstock. Generally, steam methane reformers are used on the methane in large-scale industrial processes to liberate a stream of hydrogen. Steam methane reformers, however, generally produce less than 90% pure hydrogen molecules in their product streams. Along with the hydrogen streams, side products, such as carbon dioxide, methane, and other bi-products are also produced. The presence of the bi-products pollutes the hydrogen stream making it unusable without further purification.

The process of steam reformation of methane typically consists of reacting methane (from natural gas) with steam to produce CO and $H_2$ (sometimes called synthesis gas). This reaction usually takes place over a nickel catalyst in a metal alloy tube at temperatures in the region of 800 to 1000 C and at pressures of 30 to 60 atmospheres. The reaction is equilibrium limited and is highly endothermic requiring heat input of 60 Kcal/mol $CH_4$ including the heat needed to produce steam from liquid water. Heating the outside of the reactor chamber containing the reactants provides the heat for the reaction. The chemical reaction for the reacting of methane is:

$$CH_4 + H_2O \Rightarrow CO + 3\,H_2 \tag{1}$$

The CO is to be removed from the product stream for a suitably pure hydrogen stream. To accomplish this, the product gases require further reaction. The appropriate further reaction is shifting the product gases with steam (usually called the water gas reaction) to form additional hydrogen and CO. The CO is then removed from the gas mixture by a pressure swing absorption process to produce a clean stream of hydrogen. The shift reaction produces a second portion of hydrogen by the reaction of the carbon monoxide, from the reforming reaction, with steam.

The shift reaction consumes the carbon monoxide from the reforming reaction to produce carbon dioxide and additional hydrogen gas. Water injection cools the hot gases from the steam reformer by producing steam in a phase-shift, hence the name shift reaction. The steam reacts with the CO forming additional hydrogen and $CO_2$. The reaction energy is substantially balanced so that little additional heat is required to keep the reaction going. The reaction produces a mixture of $CO_2$ and hydrogen with small amounts of CO. The shift reaction is a costly unit of production, requiring significant equipment and operating costs. The chemical equation for the shift reaction is:

$$CO + H_2O \Rightarrow CO_2 + H_2 \tag{2}$$

Finally, a pressure swing adsorption process, i.e. bi-product removal in an absorption process, generally follows steam reformation and shift reaction. Pressure swing absorbers (PSAs) can generally reduce the bi-products formed leaving a hydrogen product of about 99% pure hydrogen. To effectively remove the bi-products from the hydrogen stream, PSAs must selectively absorb and hold the carbon dioxide.

Generally, in a PSA process, the hydrogen stream is passed over a filter or bed. The particular PSA composition is selected to optimize carbon dioxide absorption at the temperatures, pressures, and composition of the shift reaction. The inclusion of the PSA or reaction cooperator, for example a calcium constituent, in the PSA bed produces a substantially pure hydrogen product, but it also increases the hydrogen generation from the fuel. According to Le Chatelier's Principle, removing a product of a reaction will shift the equilibrium of the reaction, thereby increasing the production of the other reaction products.

The separation reaction consumes carbon dioxide from the shift reaction to produce the solid calcium carbonate product. Because all of the other reactants are gases, the calcium carbonate, being a solid, is substantially removed from the reaction. The rate of absorption slows as the free calcium volume declines. The chemical equation for the PSA reaction is as follows:

$$CO2(g) + CaO(s) = CaCO3(s) \tag{3}$$

As each of the PSA beds become filled or saturated with the absorbed carbon dioxide, transforming the calcium to calcium carbonate, the PSAs begin to exude carbon dioxide back into the hydrogen stream repolluting it. Mechanically, this can be done continuously by moving the carbonate to another section of the reactor for regeneration, or by intermittently taking the reactor off-line similar to commercially available Pressure Swing Adsorption (PSA) units. The calcium oxide is not consumed in the overall scheme, but provides an effective method of pushing (actually pulling) the formation of hydrogen to completion at a much lower temperature and a much higher purity than other techniques. Nonetheless, much unreacted carbon remains.

To prevent the repollution of the stream with exuded carbon dioxide, the stream is redirected to a different PSA bed. The saturated PSA bed is then unusable without some sort of regenerative process to liberate the bi-products. Regeneration has been a complex process requiring a great deal of heat to liberate the carbon dioxide, and even at high heat, the regeneration is generally incomplete, making the PSA less effective than in its initial absorption cycle. Therefore, there is an unmet need in the art for improved methods of PSA absorption and regeneration in isolating hydrogen from carbonaceous or hydrocarbon materials.

SUMMARY OF THE INVENTION

The present invention is directed to methods and systems for generating hydrogen using reforming catalysts together with $CO_2$ gas absorbents. In one embodiment, a method in accordance with the present invention includes the use of a carbon dioxide adsorbent to promote catalytic reforming and shifting of reactants to produce hydrogen. The pressure swing absorber may be a calcium oxide, which, through $CO_2$ absorption, may be converted into calcium carbonate. In one aspect, the temperature and pressure of the absorption process may be elevated to drive the $CO_2$ into the absorbents (such as calcium oxide) and the regeneration of the absorbent may occur at reduced temperatures and pressures which may advantageously shift the equilibrium in the partial pressure-temperature relationship back to the $CO_2$ over $CaCO_3$.

In one specific embodiment, a method of pressure swing absorption includes absorbing oxides of carbon with a pressure swing absorber from a steam reformation of methane at an ambient pressure in excess of 300 psia and at an ambient temperature in excess of 600° centigrade, the steam reformation of methane producing a stream of product gas. In a further aspect, the steam reformation of methane is interrupted, allowing the regenerating of the pressure swing absorber at an ambient pressure of less than 10 psia, and at an ambient temperature sufficient to calcine the pressure swing absorber to exude carbon dioxide.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to methods and systems for generating hydrogen using reforming catalysts together with $CO_2$ gas absorbents. Many specific details of certain embodiments of the invention are set forth in the following description and in FIGS. 1–2 to provide a thorough understanding of such embodiments. One skilled in the art, however, will understand that the present invention may have additional embodiments, or that the present invention may be practiced without several of the details described in the following description.

By way of overview, methods and systems for hydrogen generation using processes based on pressure swing absorption are presented. In one embodiment, a method includes absorbing oxides of carbon with a pressure swing absorber from a steam reformation of methane. In one particular aspect, the absorbing occurs at an ambient pressure in excess of 300 psia and at an ambient temperature in excess of 600° centigrade. The steam reformation of methane produces a stream of product gas. In a further aspect, the steam reformation of methane may be interrupted to allow the regenerating of the pressure swing absorber to occur at an ambient pressure of less than 10 psia and at an ambient temperature sufficient to calcine the pressure swing absorber to exude carbon dioxide. In still another aspect, the product gas may be monitored to determine a quantity of oxides of carbon present in the product gas. In still yet another aspect, the interruption of the steam reformation of methane is responsive to the monitored quantity.

Figure 1:
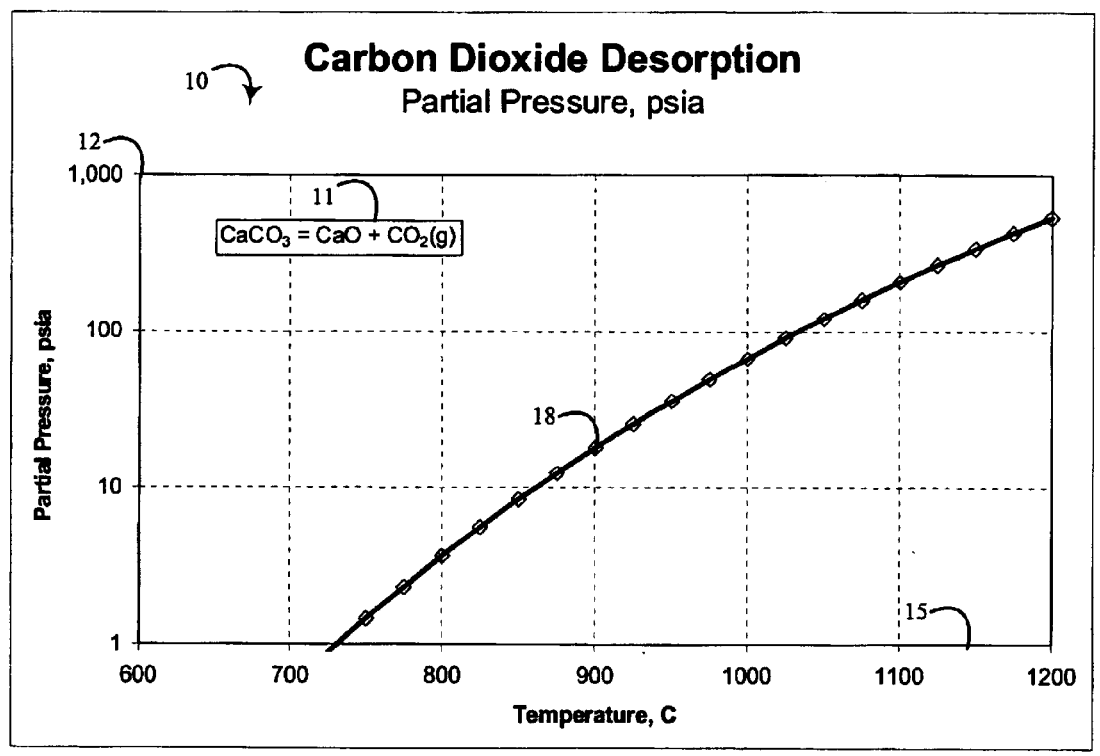
FIG. 1 is a graph of partial pressure as a function of temperature for a carbon dioxide desorption.

Referring to FIG. 1, a carbon dioxide desorption function 10 is displayed. As shown in FIG. 1, in a calcium oxide pressure swing absorption reaction 11, at a given temperature, an increase in pressure tends to drive carbon dioxide gas into a calcium oxide solid to form calcium carbonate, a solid. Conversely, as pressure is relieved, carbon dioxide gas is exuded from the solid calcium carbonate to leave calcium oxide. Where the partial pressure of carbon dioxide on a geometric scale 12 is charted as a function of temperature on a Centigrade scale 15, the curve 18 results. The implication of the curve 18 is that reducing the ambient pressure surrounding the calcium oxide pressure swing absorption reaction 11 allows the desorption of carbon dioxide at lower temperatures. Thus, at the pressure of a single atmosphere (well below current, practice), carbon dioxide will exude from the calcium carbonate at temperatures of approximately 730° or above.

Figure 2:
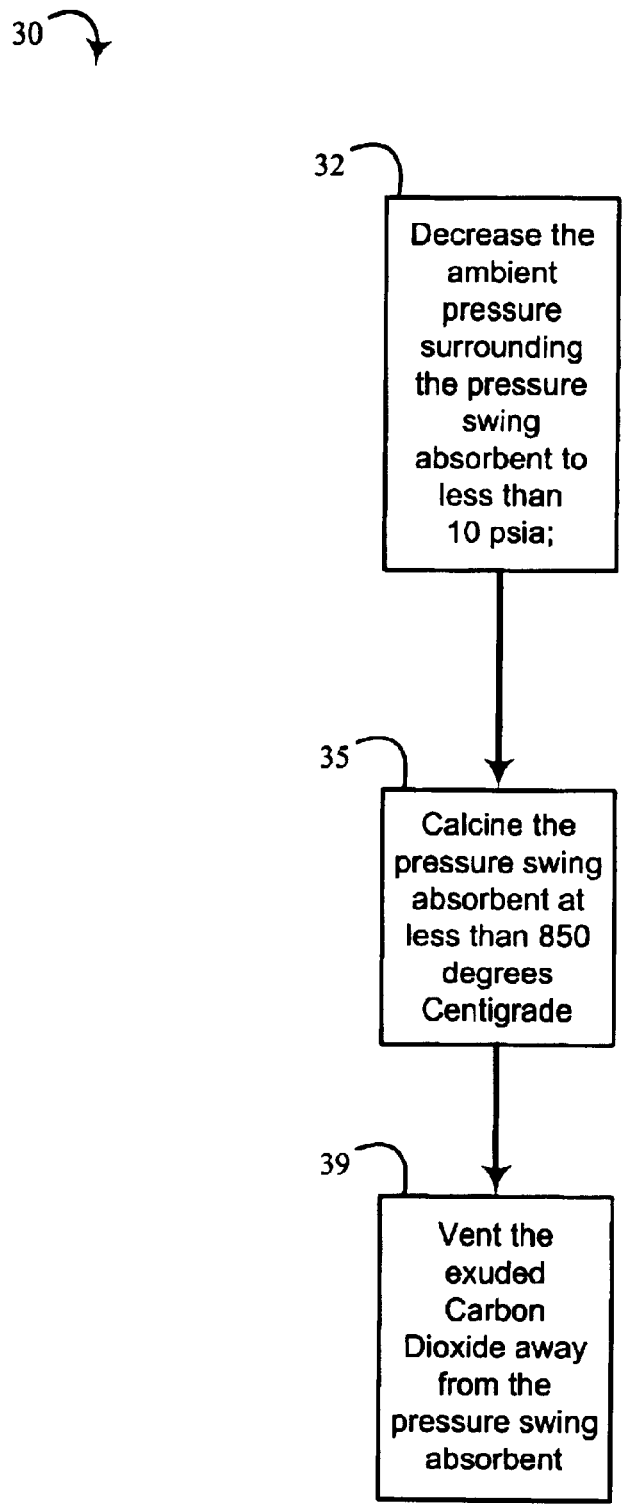
FIG. 2 is a flow chart of a method for regenerating pressure swing absorbers in accordance with an embodiment of the present invention.

A method that exploits the partial pressure relationship set out in the carbon dioxide desorption function 10 (FIG. 1) is an embodiment of a regeneration method for pressure swing absorbers 30 shown in FIG. 2. In a particular aspect, the method 30 may presume that the pressure swing absorbers have been removed from the steam reformation of methane reaction. As shown in FIG. 2, the method includes venting the ambient pressure of gases surrounding the calcium carbonate pressure swing absorbent to drop the ambient pressure to less than 10 psia at a block 32.

With continued reference to FIG. 2, at a block 35, the temperature of the pressure swing absorber is adjusted to a level sufficiently high to calcine the pressure swing absorber. The temperature adjustment (block 35) may be performed simultaneously with, or sequentially with, the venting of the gases at block 32. At a block 39, the resulting gaseous carbon dioxide is vented off to maintain the ambient pressure at a level of less than 10 psia.

Traditionally, regeneration occurs when the calcium carbonate is calcined (i.e. to heat to a high temperature to drive off volatile matter) to an elevated temperature to drive off the carbon dioxide and regenerate the adsorbent, calcium oxide. The process 30 in accordance with an embodiment of the invention exploits the use of reduced atmospheric pressure to allow the temperature to likewise be reduced without loss of efficiency. The reduced temperature and pressure at regeneration may advantageously protect the nickel-based reforming catalyst, also present in the bed, from oxidation.

In the steam reformation process, the process can be exploited advantageously in at least two alternate ways. First, where the pressure swing absorber is placed in beds with the catalyst necessary to allow the steam reformation to occur at industrial temperatures and pressures, it is generally expedient not to remove the catalyst from the beds during the regeneration of the pressure swing absorbent. Rather, the whole bed may be subjected to the regeneration process. By dropping the pressure, rather than raising the temperature to cause the regeneration, the catalyst is not subjected to extreme temperatures. By reason of the reduced temperature and pressure, oxidation of the catalyst will be reduced or eliminated. Specifically, in one exemplary embodiment, oxidization of nickel catalysts regularly used in steam reformation is advantageously eliminated.

Second, where the pressure swing absorber is granulated to a suitable size to become entrained into the stream of methane of the steam reformation of methane process, the calcium carbonate can easily be removed from the product stream without dropping the ambient pressure. In one particular embodiment, for example, the absorber is comprised of granules having a diameter of about 50 microns. In another particular embodiment, the pressure swing absorber may be removed by a cyclonic separation process, thereby producing a stream of hydrogen without gaseous oxides of carbon. Venting may occur outside of the product stream, producing carbon dioxide gas and regenerating the pressure swing absorber.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of pressure swing absorption, the method comprising:
    absorbing at least one oxide of carbon with a pressure swing absorber from a steam reformation of methane, producing a stream of product gas;
    interrupting the steam reformation of methane; and
    regenerating the pressure swing absorber at an ambient pressure of less than or approximately equal to 10 psia and at an ambient temperature sufficient to calcine the pressure swing absorber to exude carbon dioxide.

2. The method of claim 1, wherein absorbing at least one oxide of carbon includes absorbing at least one oxide of carbon with a pressure swing absorber from a steam reformation of methane at an ambient pressure in excess of 300 psia and at an ambient temperature in excess of 600° centigrade.

3. The method of claim 2, further comprising monitoring at least one oxide of carbon present in the product stream.

4. The method of claim 3, wherein interrupting the steam reformation of methane includes interrupting the steam reformation responsive to an amount of the at least one monitored oxide of carbon.

5. The method of claim 1, wherein absorbing at least one oxide of carbon with a pressure swing absorber includes absorbing at least one oxide of carbon with a pressure swing absorber disposed in a bed.

6. The method of claim 5, wherein interrupting the steam reformation of methane includes redirecting the steam reformation of methane away from the bed.

7. The method of claim 6, wherein interrupting the steam reformation of methane includes removing the bed from the steam reformation of methane.

8. The method of claim 1, wherein absorbing the at least one oxide further comprises absorbing at least one oxide of carbon using a pressure swing absorber having granules with a diameter of about 50 microns.

9. The method of claim 8, wherein absorbing at least one oxide of carbon using a pressure swing absorber further comprises entraining the granules in the stream of product gas.

10. The method of claim 9, wherein absorbing at least one oxide of carbon using a pressure swing absorber further comprises entraining the granules in a feedstream of methane.

11. The method of claim 1, wherein the pressure swing absorber is calcium oxide.

12. A method for regenerating a pressure swing absorber, the method comprising:
    adjusting an ambient pressure to less than 10 psia;
    adjusting a temperature of the pressure swing absorber sufficient to calcine the pressure swing absorber to exude carbon dioxide; and
    venting exuded carbon dioxide away from the pressure swing absorber.

13. The method of claim 12, wherein adjusting the temperature includes cooling the pressure swing absorber.

14. The method of claim 12, wherein adjusting a temperature of the pressure swing absorber further comprises adjusting the ambient pressure.

15. The method of claim 12, wherein adjusting a temperature of the pressure swing absorber further comprises adjusting a temperature of calcium oxide.

16. The method of claim 12, wherein adjusting a temperature of the pressure swing absorber further comprises adjusting a temperature of granules with a diameter of about 50 microns.

17. The method of claim 12, wherein the pressure swing absorber is present in a catalyst bed.

18. A method of absorbing carbonaceous gases in steam reformation of methane, the method comprising:
    providing methane gas and steam in about stoichiometric portions for steam methane reformation;
    absorbing carbonaceous gas with a pressure swing absorber, the pressure swing absorber adapted to at least partially remove at least one oxide of carbon in a steam reformation of methane to produce a product stream;
    interrupting the provided methane gas and steam; and
    regenerating the pressure swing absorber at an ambient pressure of less than 10 psia and at an ambient temperature sufficient to calcine the pressure swing absorber to exude carbon dioxide.

19. The method of claim 18, wherein providing methane gas and steam includes providing methane gas and steam at a pressure in excess of 300 psia and at a temperature in excess of 700° centigrade.

20. The method of claim 18, further comprising monitoring of oxides of carbon present in the product stream.

21. The method of claim 18, wherein interrupting the provided methane gas and steam further comprises interrupting the methane gas and steam in response to a monitored amount of oxides of carbon.

22. The method of claim 18, wherein the pressure swing absorber is in a bed.

23. The method of claim 22, wherein the interrupting includes redirecting the steam reformation of methane away from the bed.

24. The method of claim 22, wherein the interrupting is by removing the bed from the steam reformation of methane.

25. The method of claim 18, wherein the pressure swing absorber includes granules with a diameter of about 50 microns.

26. The method of claim 25, wherein the pressure swing absorber is entrained in the stream of product gas.

27. The method of claim 26, wherein the pressure swing absorber is entrained in a feedstream of methane.

28. The method of claim 18, wherein the pressure swing absorber is calcium oxide.

* * * * *